(12) United States Patent
Grabarnik et al.

(10) Patent No.: US 7,831,976 B2
(45) Date of Patent: *Nov. 9, 2010

(54) METHOD, SYSTEM AND PROGRAM PRODUCT FOR PREDICTING COMPUTER SYSTEM RESOURCE CONSUMPTION

(75) Inventors: Genady Grabarnik, Scarsdale, NY (US); Moon Ju Kim, Wappingers Falls, NY (US); Lev Kozakov, Stamford, CT (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1500 days.

This patent is subject to a terminal disclaimer.

(21) Appl. No.: 11/121,828

(22) Filed: May 4, 2005

(65) Prior Publication Data

US 2006/0253855 A1    Nov. 9, 2006

(51) Int. Cl.
*G06F 9/46* (2006.01)
*G06F 15/16* (2006.01)
*G06F 15/177* (2006.01)

(52) U.S. Cl. .................. 718/104; 718/105; 709/208; 709/220

(58) Field of Classification Search ............. 718/1–108; 709/208, 220
See application file for complete search history.

(56) References Cited

U.S. PATENT DOCUMENTS

| | | |
|---|---|---|
| 3,702,006 A | 10/1972 | Page |
| 4,056,846 A | 11/1977 | Callahan et al. |
| 5,838,968 A | 11/1998 | Culbert |
| 5,862,337 A | 1/1999 | Gray |
| 6,011,537 A | 1/2000 | Slotznick |
| 6,061,761 A | 5/2000 | Bachmat |
| 6,086,618 A | 7/2000 | Al-Hilali et al. |
| 6,112,257 A | 8/2000 | Mason, Jr. et al. |
| 6,189,022 B1 | 2/2001 | Binns |
| 6,223,205 B1 | 4/2001 | Harchol-Balter et al. |
| 6,247,173 B1 | 6/2001 | Subrahmanyam |
| 6,301,603 B1 | 10/2001 | Maher et al. |

(Continued)

OTHER PUBLICATIONS

Adelzaher, "An Automated Profiling Subsystem for QoS-Aware Services", 2000.

(Continued)

*Primary Examiner*—Meng-Ai An
*Assistant Examiner*—Adam Lee
(74) *Attorney, Agent, or Firm*—William E. Schiesser; Hoffman Warnick LLC

(57) ABSTRACT

Under the present invention, a computer work gradient matrix is built for each computer system that is interconnected in an environment. For each computer system for which resource consumption is desired to be predicted (e.g., "target" computer systems), a transition work cocycle is generated and provided to a master computer system. A set of task work paths will be constructed for the master computer system. Thereafter, an initial resource consumption value can be computed on the master computer system based on the computer work gradient matrix and the set of task work paths for the master computer system as well as a current background loading level that is being experienced by the target computer system. Then, using the initial resource consumption and the transition work cocycle for the target computer system(s), a resource consumption of the target computer system(s) can be predicted on the master computer system.

22 Claims, 10 Drawing Sheets

U.S. PATENT DOCUMENTS

| | | | |
|---|---|---|---|
| 6,330,719 B1 | 12/2001 | Zigmond et al. |
| 6,338,072 B1 | 1/2002 | Durand et al. |
| 6,338,089 B1 | 1/2002 | Quinlan |
| 6,341,333 B1 | 1/2002 | Schreiber et al. |
| 6,389,028 B1 | 5/2002 | Bondarenko et al. |
| 6,415,027 B1 | 7/2002 | Malik |
| 6,442,650 B1 | 8/2002 | Bachmat et al. |
| 6,487,578 B2 | 11/2002 | Ranganathan |
| 6,487,634 B1 | 11/2002 | Bachmat |
| 6,574,587 B2 | 6/2003 | Waclawski |
| 6,584,097 B1 | 6/2003 | Malik |
| 6,601,084 B1 | 7/2003 | Bhaskaran et al. |
| 6,606,661 B1 | 8/2003 | Agrawal et al. |
| 6,618,742 B1 * | 9/2003 | Krum ............... 718/100 |
| 6,694,405 B2 | 2/2004 | Lam et al. |
| 6,711,649 B1 | 3/2004 | Bachmat et al. |
| 6,714,536 B1 | 3/2004 | Dowling |
| 6,766,416 B2 | 7/2004 | Bachmat |
| 6,801,906 B1 | 10/2004 | Bates et al. |
| 6,832,255 B1 | 12/2004 | Rumsewicz et al. |
| 6,859,834 B1 | 2/2005 | Arora et al. |
| 6,990,525 B1 | 1/2006 | Ying et al. |
| 7,089,159 B2 | 8/2006 | Hachiya |
| 7,296,056 B2 | 11/2007 | Yaung |
| 7,305,471 B2 * | 12/2007 | Odhner et al. ............... 709/226 |
| 7,406,691 B2 | 7/2008 | Fellenstein et al. |
| 7,441,244 B2 | 10/2008 | Longobardi |
| 7,526,767 B1 * | 4/2009 | Rhee et al. ............... 718/104 |
| 7,716,151 B2 | 5/2010 | Tiwari et al. |
| 2002/0004833 A1 | 1/2002 | Tonouchi |
| 2002/0083342 A1 | 6/2002 | Webb et al. |
| 2003/0018762 A1 | 1/2003 | Mullen |
| 2003/0149717 A1 | 8/2003 | Heinzman |
| 2004/0181794 A1 | 9/2004 | Coleman et al. |
| 2005/0107997 A1 | 5/2005 | Watts et al. |
| 2006/0130067 A1 | 6/2006 | Grabarnik et al. |
| 2006/0253855 A1 | 11/2006 | Grabarnik et al. |
| 2008/0262822 A1 | 10/2008 | Hardwick et al. |

OTHER PUBLICATIONS

Ahituv et al., "A Model for Predicting and Evaluating Computer Resource Consumption", Dec. 1998, vol. 31, No. 12, Communications of the ACM, pp. 1467-1473.

Ulrik Brandes et al, "Experiments on Graph Clustering Algorithms", Proc. 11th European Symposium Algorithms (ESA 2003), Sep. 19, 2003, pp. 568-571.

Chang-Shing Perng et al, "Data-driven Monitoring Design of Service Level and Resource Utilization", Integrated Network Management, 2005, IEEE International Symposium on Nice, France, May 15-19, 2005, Piscataway, NJ, USA, IEEE, May 15, 2005, pp. 89-101.

Lingyun Yang, et al, "Statistical Data Reduction for Efficient Application Performance Monitoring", Argonne National Laboratory Technical Report, Aug. 2005, pp. 1-14.

Grabarnik et al., U.S. Appl. No. 11/011,344, filed Dec. 14, 2004, Office Action Communication dated Dec. 24, 2009, 17 pages.

Lee, Notice of Allowance and Fee(s) Due for U.S. Appl. No. 11/011,344 dated Jul. 2, 2010, 18 pages.

Neurauter, Notice of Allowance and Fee(s) Due for U.S. Appl. No. 11/390,527 dated Jul. 26, 2010, 26 pages.

* cited by examiner

FIG. 3

|   | BACKGROUND LOADING LEVELS | | |
|---|---|---|---|
|   | A | B | C |
| X | 13% | 46% | 55% |
| Y | 8% | 20% | 32% |
| Z | 24% | 67% | 93% |

WORK INCREMENTS

22A1

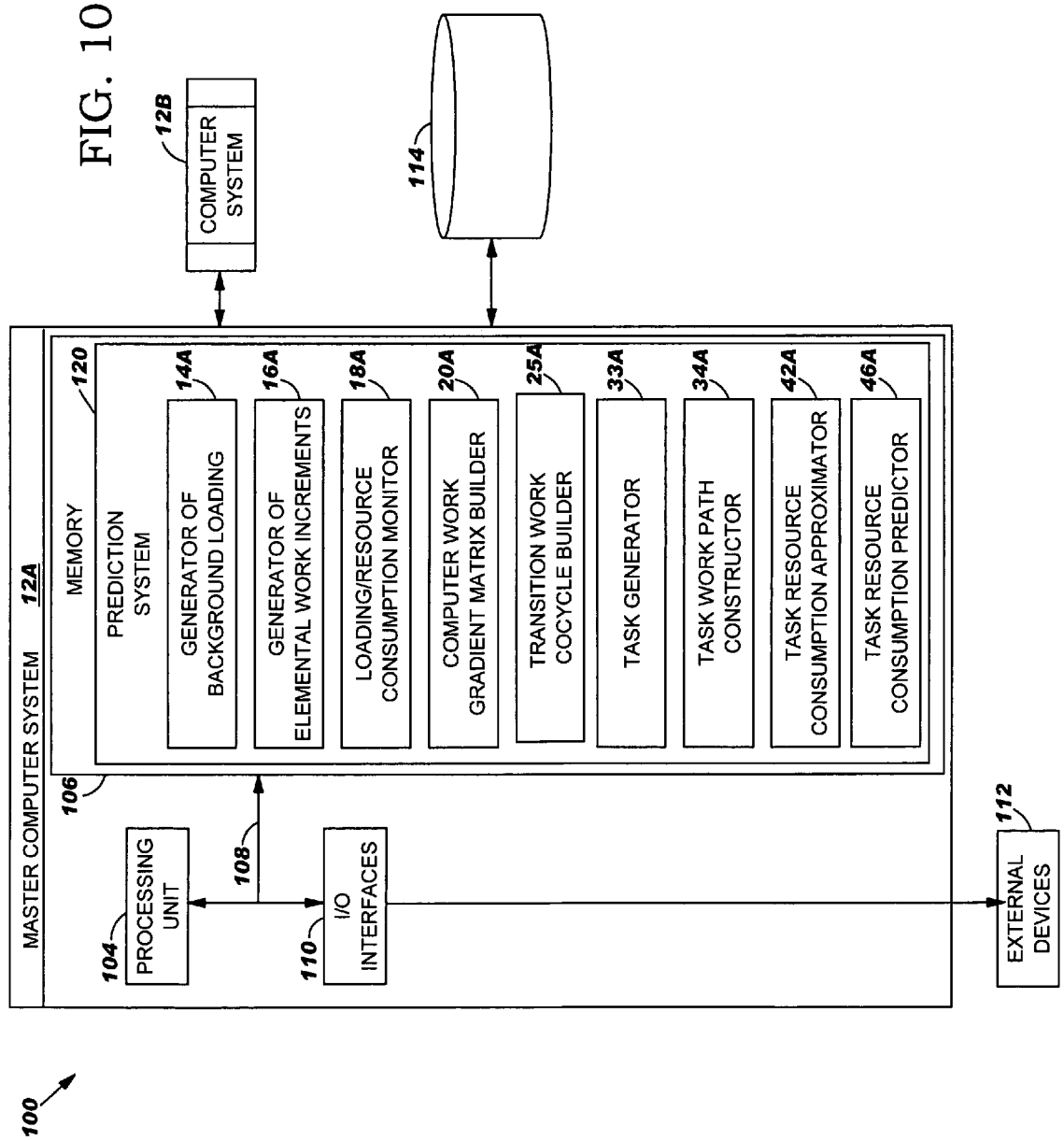

METHOD, SYSTEM AND PROGRAM PRODUCT FOR PREDICTING COMPUTER SYSTEM RESOURCE CONSUMPTION

CROSS-REFERENCE TO RELATED APPLICATIONS

This Application is related in some aspects to co-pending application Ser. No. 11/011,344, filed Dec. 14, 2004 and entitled "Method, System and Program Product for Approximating Resource Consumption of a Computer System," which is hereby incorporated by reference.

FIELD OF THE INVENTION

In general, the present invention relates to the prediction of computer resource consumption. Specifically, the present invention relates to a method, system and program product for predicting a resource consumption of one computer system on another computer system.

BACKGROUND OF THE INVENTION

Resource utilization/consumption is one of the critical characteristics of any computing task. This is especially the case for a grid computing environment. In general, a vast quantity of computing power is often wasted due to the under-utilization of resources. To date, planning and sizing for computing requirements has typically been based on peak demand. However, statistically speaking, the actual resource utilization is usually on the order of 60% for the IBM S/390 (zSeries) machines, and under 10% for current AIX and Intel machines. Harnessing the unutilized computing power can provide immediate economic benefits to any organization that has a large installed base of servers.

Grid infrastructure is defined as flexible, secure, coordinated resource sharing among a dynamic collection of individuals, institutions, and resources. It is distinguished from conventional distributed (enterprise) computing by its focus on large-scale resource sharing, innovative applications, and, in some cases, high-performance orientation. The collection of individual resources and institutions that contribute resources to a particular grid and/or use the resources in that grid, is referred to as a virtual organization and represents a new approach to computing and problem solving based on collaboration among multiple disciplines in computation and data-rich environments. To add a resource under the grid infrastructure, current resource utilization information is needed. This is an important attribute of the "Grid Resource Manager," which allocates the resources within the grid based on the resource requirements of the application(s).

Another need for the approximation/estimation of computing resources is for installation of software packages. Specifically, before installing a software package or application on a given computer, a user needs to know what resources (e.g., memory, CPU, etc.) will be required. Another important question is how much time and computing resources are needed to run a given task on a given machine with some other tasks and services running in the background. Usually, to find answers to these questions, users turn to the software documentation, which may contain a list of resource requirements, and, sometimes, application performance data. The problem is that such documentation data is only valid for one particular hardware/software configuration, and can hardly be applied to any other configuration. In addition, the performance data is usually obtained in an experiment, when the given software task was running in parallel with other tasks and services. There is no easy way to estimate how much the performance data will change, if the machine loading changes.

In many computer environments such as a Grid infrastructure, multiple computer systems are typically interconnected in a cluster or the like. To date approximation of resource consumption is a task that is performed on each such computer system. Thus, the more computer systems there are provided, the more calculations that must be made. Heretofore, no system has suggested a way to consolidate the resource consumption calculations onto one computer system. Such a methodology would significantly streamline and consolidate the number of calculations.

SUMMARY OF THE INVENTION

In general, the present invention provides a method, system and program product for predicting a resource consumption for one computer system on another computer system. Specifically, under the present invention, a computer work gradient matrix is built for each computer system that is interconnected in an environment. The work gradient matrices are provided to one computer system that is designated as the "master" computer system for the purposes of the present invention. For each computer system for which resource consumption is desired to be predicted (e.g., "target" computer systems), a transition work cocycle is generated and provided to the master computer system. A transition work cocycle for a target computer system is typically based on its computer work gradient matrix and the computer work gradient matrix of the master computer system. To this extent, the transition work cocycle typically represents a mapping of a work load tensor of the target computer system to a work load tensor of the master computer system, as well as a mapping of task work paths for the master computer system to the target computer system.

In any event, a set of task work paths will be constructed for the master computer system. Thereafter, an initial resource consumption value can be computed on the master computer system based on the master computer system's computer work gradient matrix and set of task work paths, as well as a current background loading level that is being experienced by target computer system. Then, using the initial resource consumption computed on the master computer system and the transition work cocycle for the target computer system(s), a resource consumption of the target computer system(s) can be predicted on the master computer system. Thus, the present invention allows the calculations for predicting resource consumption for any quantity of target computer systems to be conducted on a single (master) computer system.

A first aspect of the present invention provides a method for predicting a resource consumption for one computer system on another computer system, comprising: obtaining a computer work gradient matrix for each of a first computer system and a second computer system; obtaining, on the second computer system, a transition work cocycle for the first computer system, wherein the transition work cocycle is based on the computer work gradient matrices and maps a work load tensor of the first computer system to a work load tensor of the second computer system; constructing a set of task work paths for the second computer system; computing an initial resource consumption on the second computer system based on the computer work gradient matrix of the second computer system, the set of task work paths, and a current background loading level of the first computer system; and predicting, on the second computer system, a resource consumption of the first computer system based on the initial resource consumption computed on the second computer system and the transition work cocycle for the first computer system.

A second aspect of the present invention provides a system for predicting a resource consumption for one computer system on another computer system, comprising: a system for obtaining a computer work gradient matrix for each of a first computer system and a second computer system; a system for obtaining, on the second computer system, a transition work cocycle for the first computer system, wherein the transition work cocycle is based on the computer work gradient matrices and maps a work load tensor of the first computer system to a work load tensor of the second computer system; a system for constructing a set of task work paths for the second computer system; a system for computing an initial resource consumption on the second computer system based on the computer work gradient matrix of the second computer system, the set of task work paths, and a current background loading level of the first computer system; and a system for predicting, on the second computer system, a resource consumption of the first computer system based on the initial resource consumption computed on the second computer system and the transition work cocycle for the first computer system.

A third aspect of the present invention provides a program product stored on a computer readable medium for predicting a resource consumption for one computer system on another computer system, the computer readable medium comprising program code for performing the following steps: obtaining a computer work gradient matrix for each of a first computer system and a second computer system; obtaining, on the second computer system, a transition work cocycle for the first computer system, wherein the transition work cocycle is based on the computer work gradient matrices and maps a work load tensor of the first computer system to a work load tensor of the second computer system; constructing a set of task work paths for the second computer system; computing an initial resource consumption on the second computer system based on the computer work gradient matrix of the second computer system, the set of task work paths, and a current background loading level of the first computer system; and predicting, on the second computer system, a resource consumption of the first computer system based on the initial resource consumption computed on the second computer system and the transition work cocycle for the first computer system.

A fourth aspect of the present invention provides a method for deploying an application for predicting a resource consumption for one computer system on another computer system, comprising: providing a computer infrastructure being operable to: obtain a computer work gradient matrix for each of a first computer system and a second computer system; obtain, on the second computer system, a transition work cocycle for the first computer system, wherein the transition work cocycle is based on the computer work gradient matrices and maps a work load tensor of the first computer system to a work load tensor of the second computer system; construct a set of task work paths for the second computer system; compute an initial resource consumption on the second computer system based on the computer work gradient matrix of the second computer system, the set of task work paths, and a current background loading level of the first computer system; and predict, on the second computer system, a resource consumption of the first computer system based on the initial resource consumption computed on the second computer system and the transition work cocycle for the first computer system.

A fifth aspect of the present invention provides computer software embodied in a propagated signal for predicting a resource consumption for one computer system on another computer system, the computer software comprising instructions to cause a computer system to perform the following functions: obtain a computer work gradient matrix for each of a first computer system and a second computer system; obtain, on the second computer system, a transition work cocycle for the first computer system, wherein the transition work cocycle is based on the computer work gradient matrices and maps a work load tensor of the first computer system to a work load tensor of the second computer system; construct a set of task work paths for the second computer system; compute an initial resource consumption on the second computer system based on the computer work gradient matrix of the second computer system, the set of task work paths, and a current background loading level of the first computer system; and predict, on the second computer system, a resource consumption of the first computer system based on the resource consumption computed for the second computer system and the transition work cocycle for the first computer system.

A sixth aspect of the present invention provides a business method for predicting a resource consumption for one computer system on another computer system.

Therefore, the present invention provides a method, system and program product for predicting a resource consumption for one computer system on another computer system.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 3 depicts an illustrative face of a computer work gradient matrix according to the present invention.

FIG. 10 depicts a more specific computerized implementation of the present invention.

It is noted that the drawings of the invention are not to scale. The drawings are intended to depict only typical aspects of the invention, and therefore should not be considered as limiting the scope of the invention. In the drawings, like numbering represents like elements between the drawings.

BEST MODE FOR CARRYING OUT THE INVENTION

For convenience purposes, the Best Mode for Carrying Out the Invention will have the following sections:
I. General Description
   A. Computer Work Gradient Matrix
   B. Transition Work Cocycle
   C. Task Work Path
   D. Approximation of Resource Consumption
   E. Prediction of Resource Consumption
II. Computerized Implementation I. General Description As indicated above, the present invention provides a method, system and program product for predicting a resource consumption for one computer system on another computer system. Specifically, under the present invention, a computer work gradient matrix is built for each computer system that is interconnected in an environment. The work gradient matrices are provided to one computer system that is designated as the "master" computer system for the purposes of the present invention. For each computer system for which resource consumption is desired to be predicted (e.g., "target" computer systems), a transition work cocycle is generated and provided to the master computer system. A transition work cocycle for a target computer system is typically based on its computer work gradient matrix and the computer work gradient matrix of the master computer system. To this extent, the transition work cocycle typically represents a mapping of a work load tensor of the target computer system to a work load tensor of the master computer system, as well as a mapping of task work paths from the master computer system to the target computer system.

In any event, a set of task work paths will be constructed for the master computer system. Thereafter, an initial resource consumption value can be computed on the master computer system based on the master computer system's computer work gradient matrix and set of task work paths, as well as a current background loading level that is being experienced by target computer system. Then, using the initial resource consumption computed on the master computer system and the transition work cocycle for the target computer system(s), a resource consumption of the target computer system(s) can be predicted on the master computer system. Thus, the present invention allows the calculations for predicting resource consumption for any quantity of target computer systems to be conducted on a single (master) computer system.

Figure 1:
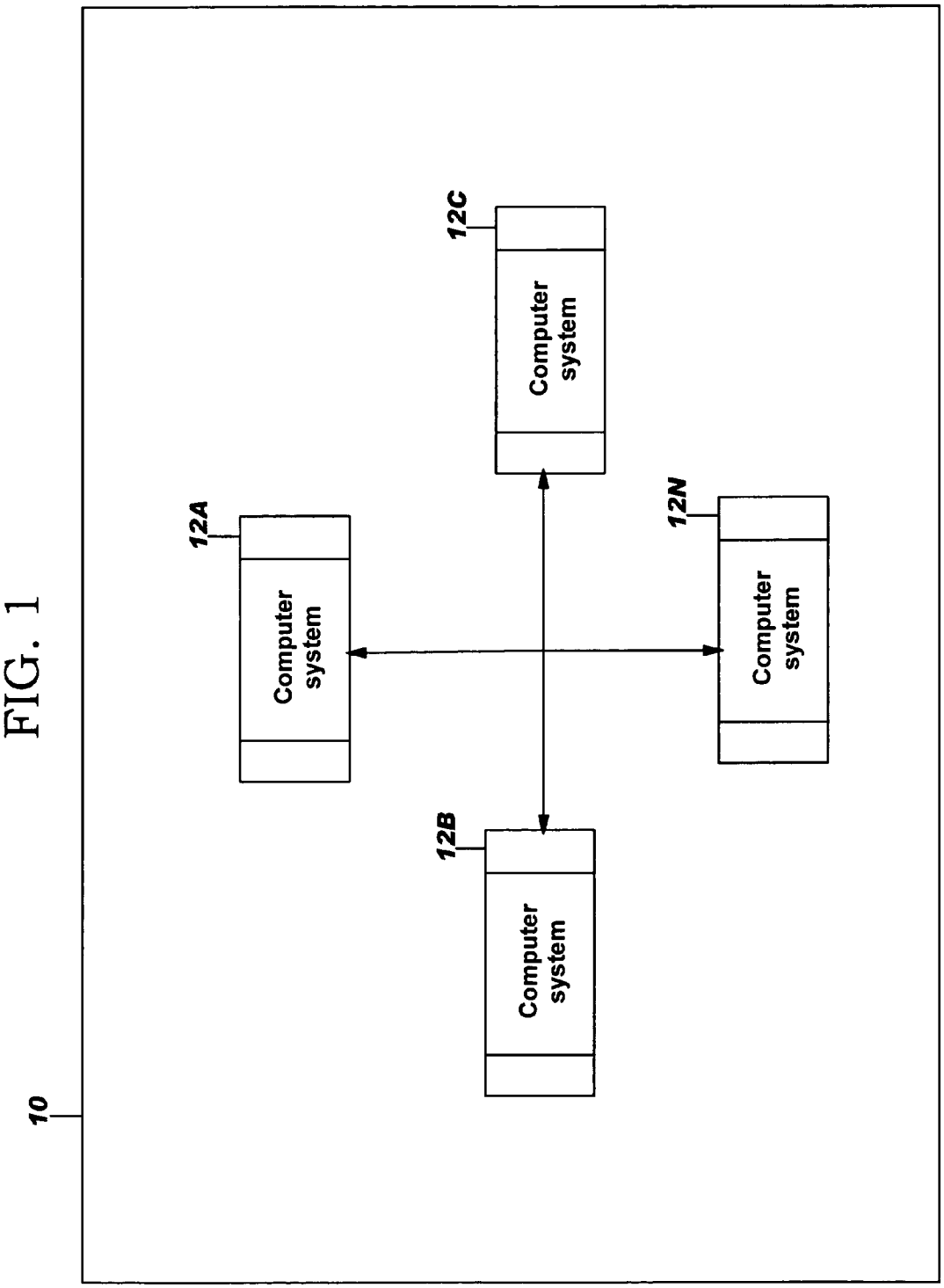
FIG. 1 depicts a set of computer systems interconnected within an environment according to the present invention.

Referring now to FIG. 1, a computer infrastructure/environment 10 containing a set of interconnected computer systems 12A-N is shown. It should be understood that environment 10 can represent any type of computing environment now known or later developed. For example, environment 10 can be a Grid Storage Architecture (GSA) such as that currently implemented by International Business Machines Corp. of Armonk, N.Y. To this extent, environment 10 could include other components (hardware and/or software) not shown in FIG. 1. Moreover, computer systems 12A-N can communicate directly, or over a network (e.g., the Internet, a wide area network (WAN), a local area network (LAN), a virtual private network (VPN), etc. In the case of the latter, communication between computer systems 12A-N can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

In any event, each computer system 12A-N can include a "prediction system" (shown and described in more detail below in conjunction with FIG. 10). Under the present invention, the prediction system will be used to predict the resource consumption of one computer system (e.g., 12B) based on the resource consumption of another computer system (e.g., 12A). As used herein, the term "target" computer system is used to refer to the computer system for which resource consumption is being predicted, while the term "master" computer system is used to refer to the computer system on which this prediction will be computed. To this extent, it should be understood that the term "master" does not necessarily refer to a master-slave or client-server relationship between the two computer systems. For example, both the master computer system and the target computer system could be clients within environment 10. Inclusion of a prediction system on each computer system 12A-N allows the present invention to be carried out on any computer system 12A-N. In such an embodiment, any computer system 12A-N could be designated as the master computer system.

A. Computer Work Gradient Matrix (Matrix)

Figure 2:
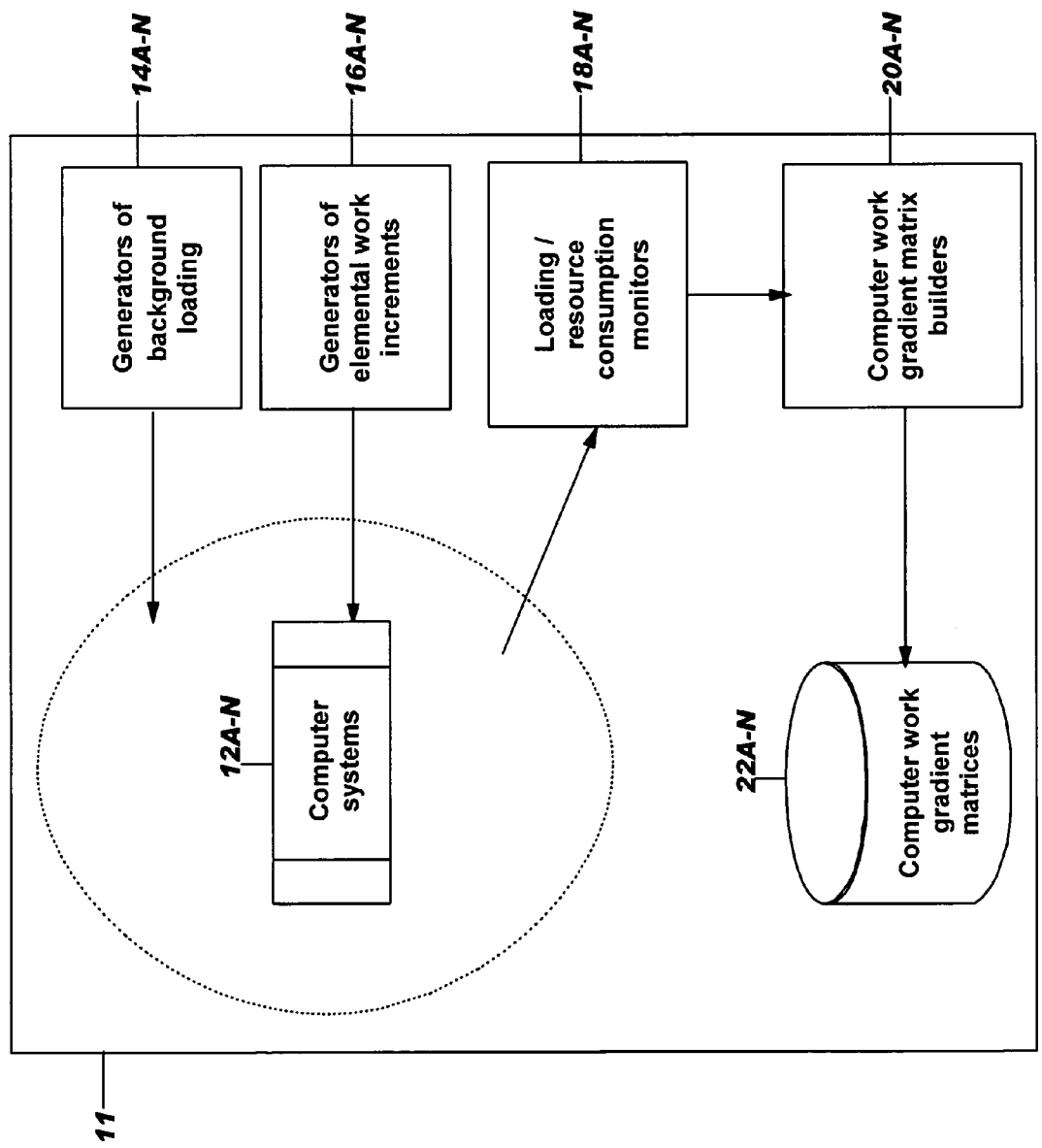
FIG. 2 depicts an illustrative system for building a computer work gradient matrix according to the present invention.

Referring now to FIG. 2, an illustrative system 11 for building a computer work gradient matrix (hereinafter "matrix") is shown. In general, a distinct matrix 22A-N is built for each computer system 12A-N. The matrix for a given computer system characterizes the ability of that computer system to provide requested resources (e.g., memory, processing unit/CPU) on top of different background loading levels. Thus, the matrix is typically unique for the given computer configuration, and is a matrix-valued function of the background loading.

To build matrices 22A-N under the present invention, generators of background loading 14A-N run a set of calibrated tasks to provide a set (e.g., one or more) of predefined levels of background loading for the computer system 12A-N. For each level of background loading, generators of elemental work increments 16A-N perform a set of predefined operations to emulate small work increments associated with each significant computing resource. In a typical embodiment, generators of elemental work increments 16A-N will emulate work in increments of 1% or the like. As background loading and work increments are being applied to the computer system, loading/resource consumption monitors 18A-N will measure the changes in the loading/resource consumption. Based on these measurements, computer work gradient matrix builders 20A-N calculates and stores the elements of the matrices 22A-N.

For example, assume that a matrix 22A is being built for computer system 12A. This process is further illustrated below:

(1) Generator of background loading 14A generates different loads of computer system 12A using predefined increments of load levels (e.g., 5%, 10%, ..., 100%) for each of the measurement coordinates (e.g., memory utilization, CPU utilization, etc.). In an illustrative embodiment, for 2 measurement coordinates, all possible loads will be pairs {(0.0,0.0), (0.0, 0.05), (0.0,0.1), ..., (0.05, 0.0), (0.05, 0.05), ... (1.0, 1.0)} that are measured in relative units (e.g., % of CPU cycles and % of Main Memory).

(2) For each level of load, generator of elemental work increments 16A generates additional permanent requests for resources of the same predefined size (e.g., request for number of CPU cycles generating 5% of CPU Utilization within 1 second under minimal load, and another request for 5% of Memory).

(3) For the load creation, loading/resource consumption monitor 18A controls the background load level of computer system 12A.

(4) After incremental requests are generated, computer work gradient matrix builder 20A obtains results of the measurements from loading/resource consumption monitor 18A showing how fast computer system 12A is able to provide requested resources. It then creates elements of matrix 22A as fraction/ratio of appropriate measurement (e.g., number of cycles generating 5% of CPU utilization within 1 second under minimal load to the time it took). In some cases, when computer system 12A already is running say under 97% of CPU utilization, it is unable to provide proper resources, in this case the time needed to fulfill the request is set to infinity and appropriate element of the matrix 22A will be 0.

(5) Matrix 22A is stored for further usage.

In general, matrices 22A-N are multidimensional structures (e.g., 2-dimensional, 3-dimensional, etc.) that set forth consumption levels of a set of resources of the corresponding computer system 12A-N in response to a set of background loading levels and a set of elemental work increments applied to the computer system 12A-N. In a typical embodiment, matrices 22A-N are cube-like structures wherein each portion or face represents a different computer resource. For example, one face of matrices 22A-N could represent CPU utilization, while another represents memory utilization.

Referring to FIG. 3, an illustrative face 22A1 of a matrix 22A (FIG. 1) is shown. Assume in this illustrative example that face 22A1 pertains to CPU utilization. As can be seen, face 22A1 provides three levels of background loading (A-C) and three levels of elemental work increments (X-Z). The values within the cells of face 22A1 represent the CPU utilization for the respective levels of background loading and element work increments. For example, for background loading level "B" and elemental work increment level "Z," CPU utilization of computer system 12A was 67%.

By building matrices 22A-N in this manner, a snapshot of the respective computer systems' 12A-N resource consumption in view of varying levels of background loading and elemental work increments can be developed. It should be appreciated that face 22A1 is intended to be illustrative only. As such, three levels of background loading and elemental work increments are shown for illustrative purposes only.

B. Transition Work Cocycle

Figure 4:
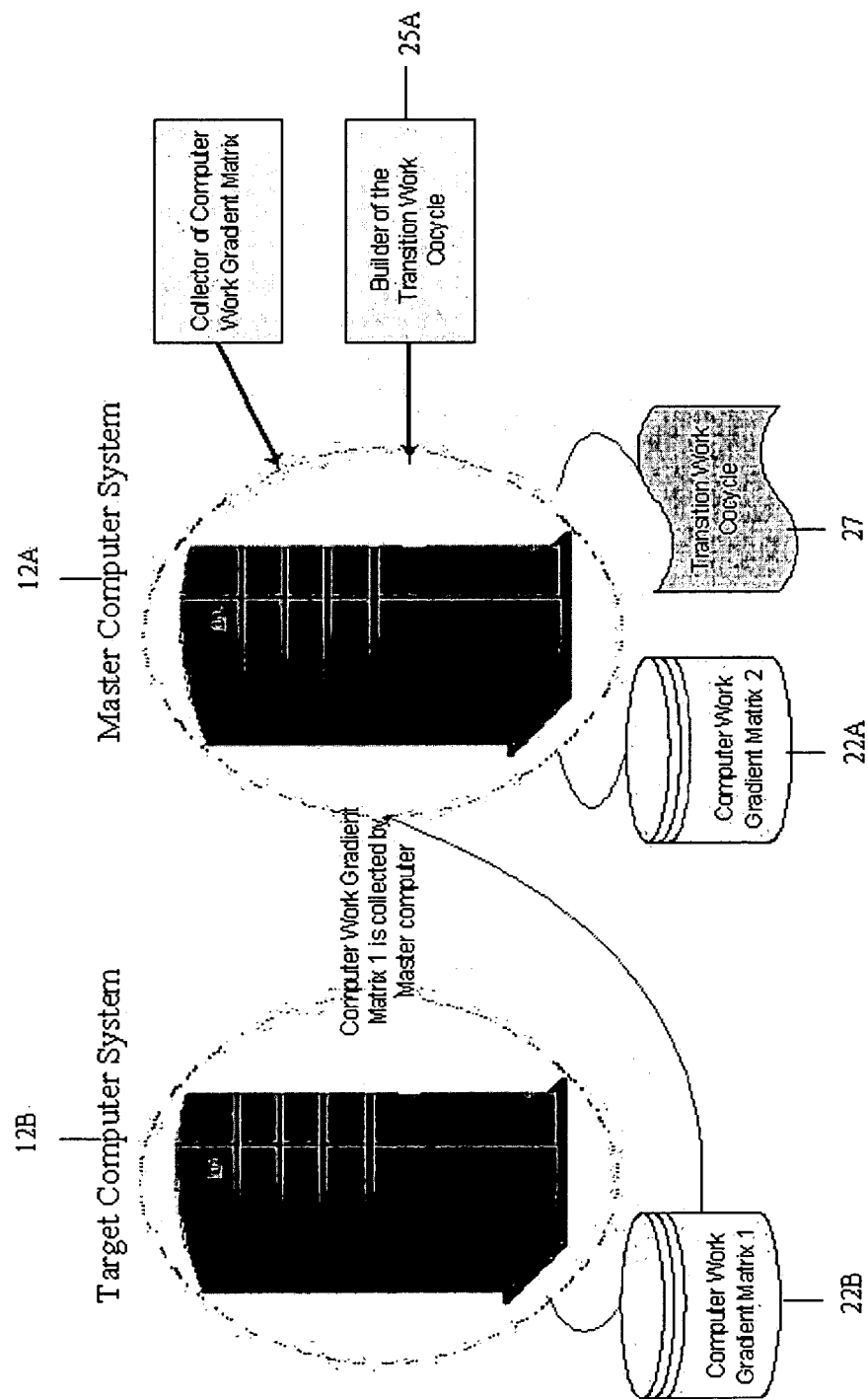
FIG. 4 depicts an illustrative system for building a transition work cocycle according to the present invention

After computer work gradient matrices 22A-N are built, a transition work cocycle will be built for the target computer system and provided to the master computer system. Referring to FIG. 4, this process is shown in greater detail. For the purposes of an illustrative example, computer system 12A will be referred to as the master computer system while computer system 12B will be referred to as the target computer system whose resource consumption is being predicted. As shown, matrix 22B for target computer system 12B is provided to master computer system 12A. Based on matrices 12A and 12B, transition work cocycle builder 25A will build a transition work cocycle 27 for target computer system 12B. In general, transition work cocycle 27 is a mapping of the work load tensor for target computer system 12B to master computer system 12A, as well as a mapping of task work paths for master computer system 12A to target computer system 12B. Specifically, transition work cocycle 27 is generated in such a way that a certain level of load on one computer system get translated into point of the same level of load on the other computer system, and a value of tensor corresponding to the certain level on one computer system maps to a value of tensor on the other computer system. In a typical embodiment, transition work cocycle builder 25A accomplishes this by solving set of linear differential equations describing such transformations. However, the latter function (tensor value mapping) may be solved by using applied approximation methods.

C. Task Work Path

Figure 5:
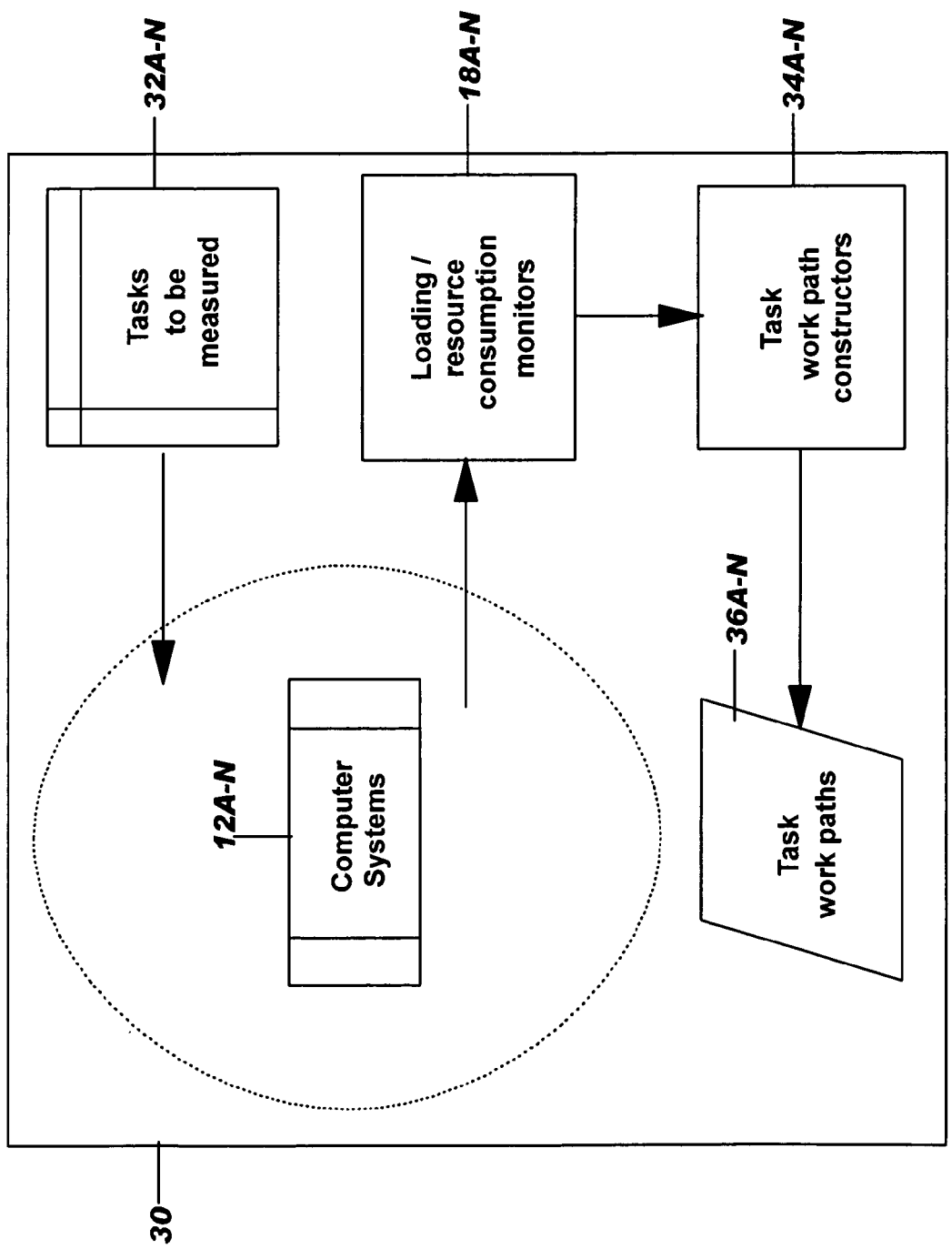
FIG. 5 depicts an illustrative system for constructing a task work path according to the present invention.

Referring now to FIG. 5, an illustrative system 30 for constructing task work paths 36A-N is shown in detail. Each task work path 36A-N typically characterizes consumption levels of the resources in response to a computing task applied to computer system 12A-N at a particular/fixed background loading level (as a function of time).

As shown in FIG. 5, given computing tasks 32A-N start/are applied to computer system 12A-N. Loading/resource consumption monitors 18A-N measure current initial background loading levels, as well as all the changes in the loading/resource consumption during the execution of tasks 32A-N. Task work path constructors 34A-N process these measurements at small predefined time intervals, and constructs task work paths 36A-N for the given initial background loading level(s).

For example, assume that a set of (e.g., one or more) task work paths 36A is being built for computer system 12A. This process is further illustrated below:

(1) Task 32A that should be measured is run on the computer system 12A.

(2) Loading/resource consumption monitor 18A measures the computer system 12A resource consumption as an initial load.

(3) Loading/Resource consumption monitor 18A creates computer system 12A resources consumption snapshots at times with predefined increments (e.g., 5 seconds).

(4) Task work path constructor 34A uses computer system 12A resources snapshots to generate task work path 36A as a temporal path in the space of measurements.

Figure 6:
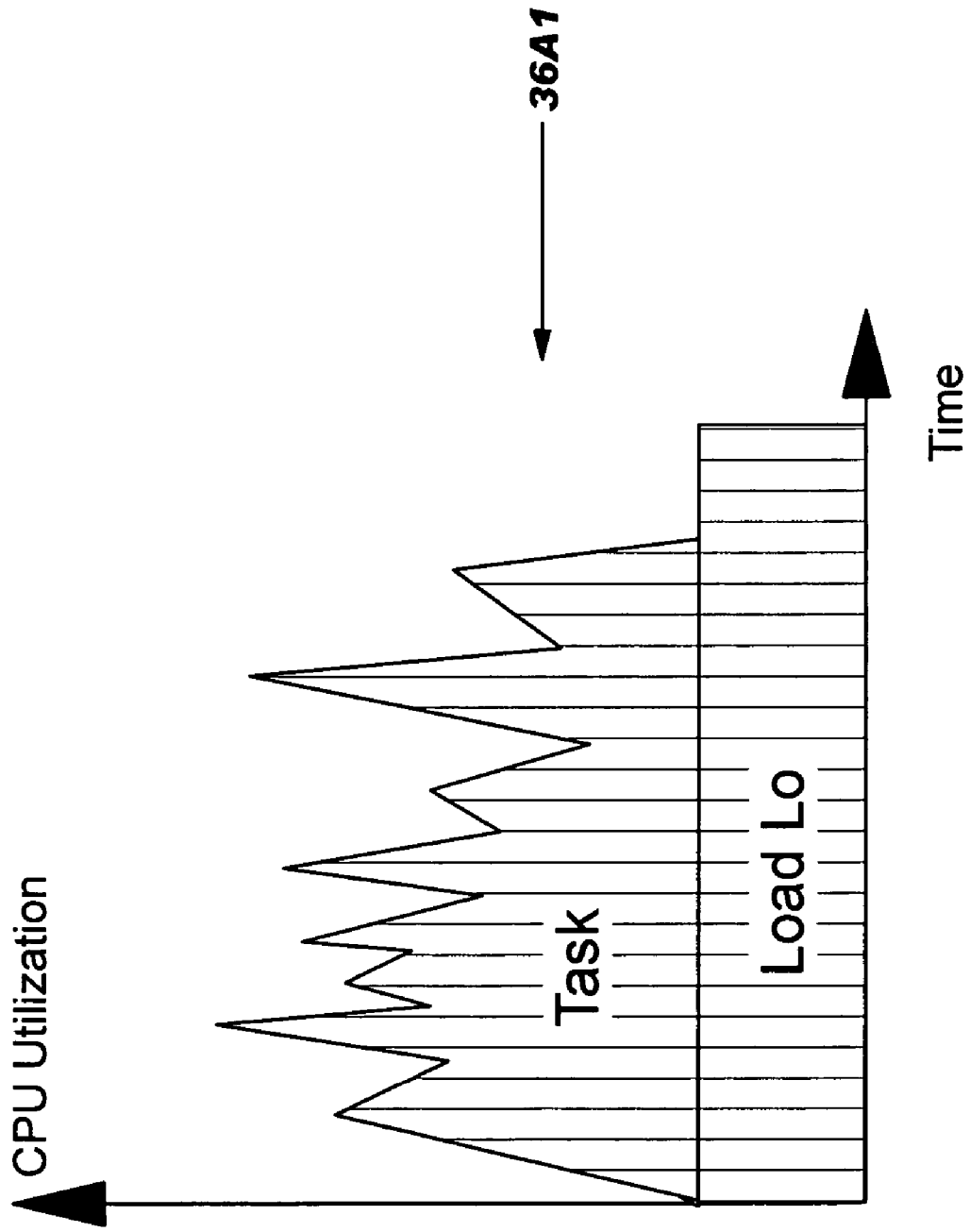
FIG. 6 depicts a first illustrative task work path according to the present invention.
Figure 7:
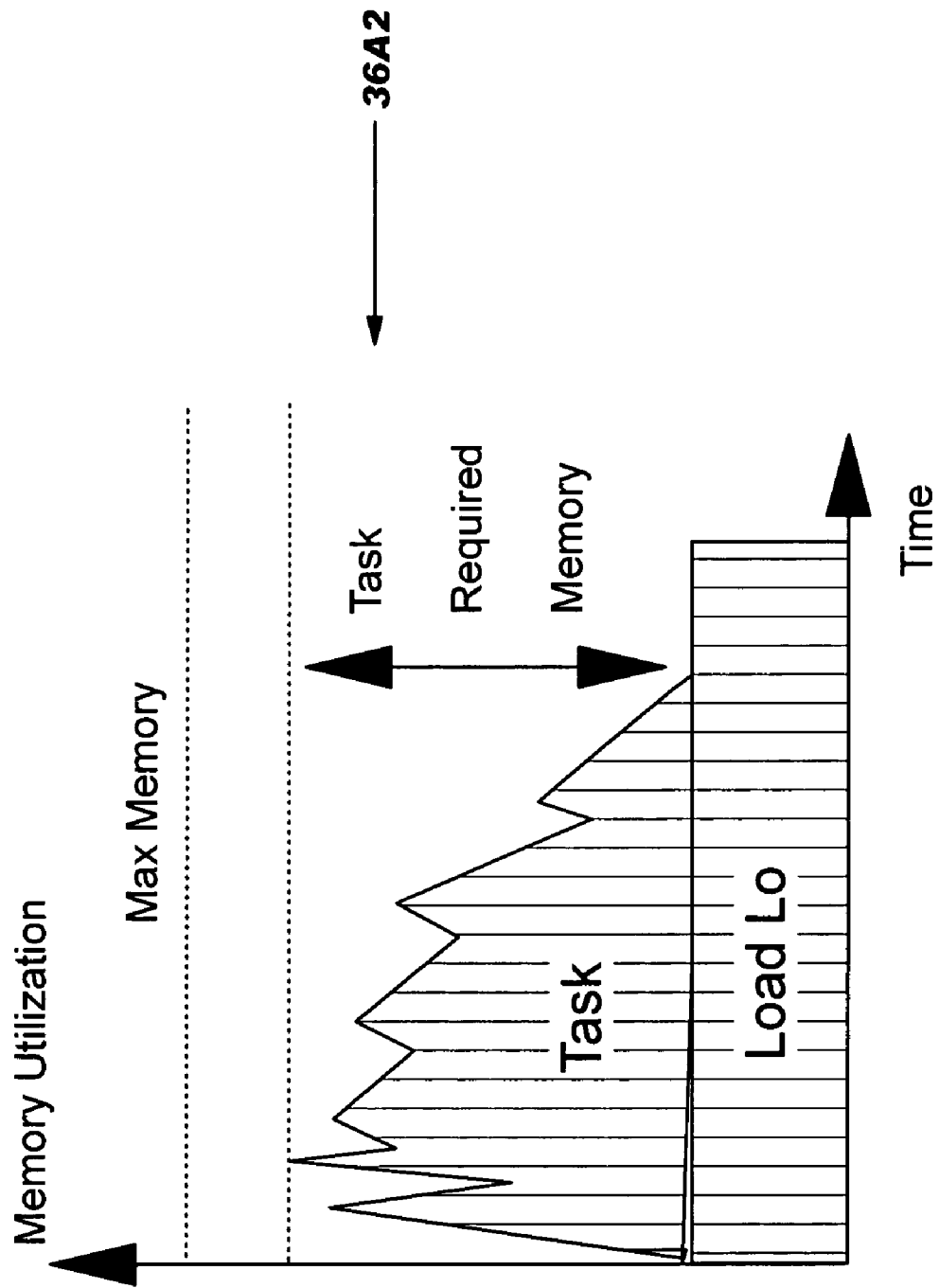
FIG. 7 depicts a second illustrative task work path according to the present invention.

Referring to FIGS. 6 and 7, illustrative task work paths 36A1 AND 36A2 are shown. Specifically, FIG. 6 depicts a task work path 36A1 for CPU utilization over time in response to the task 32A as applied to computer system 12A at a fixed level of background loading. FIG. 7 depicts a task work path 36A2 for memory utilization over time in response to the same task 32A.

D. Approximation of Resource Consumption

Figure 8:
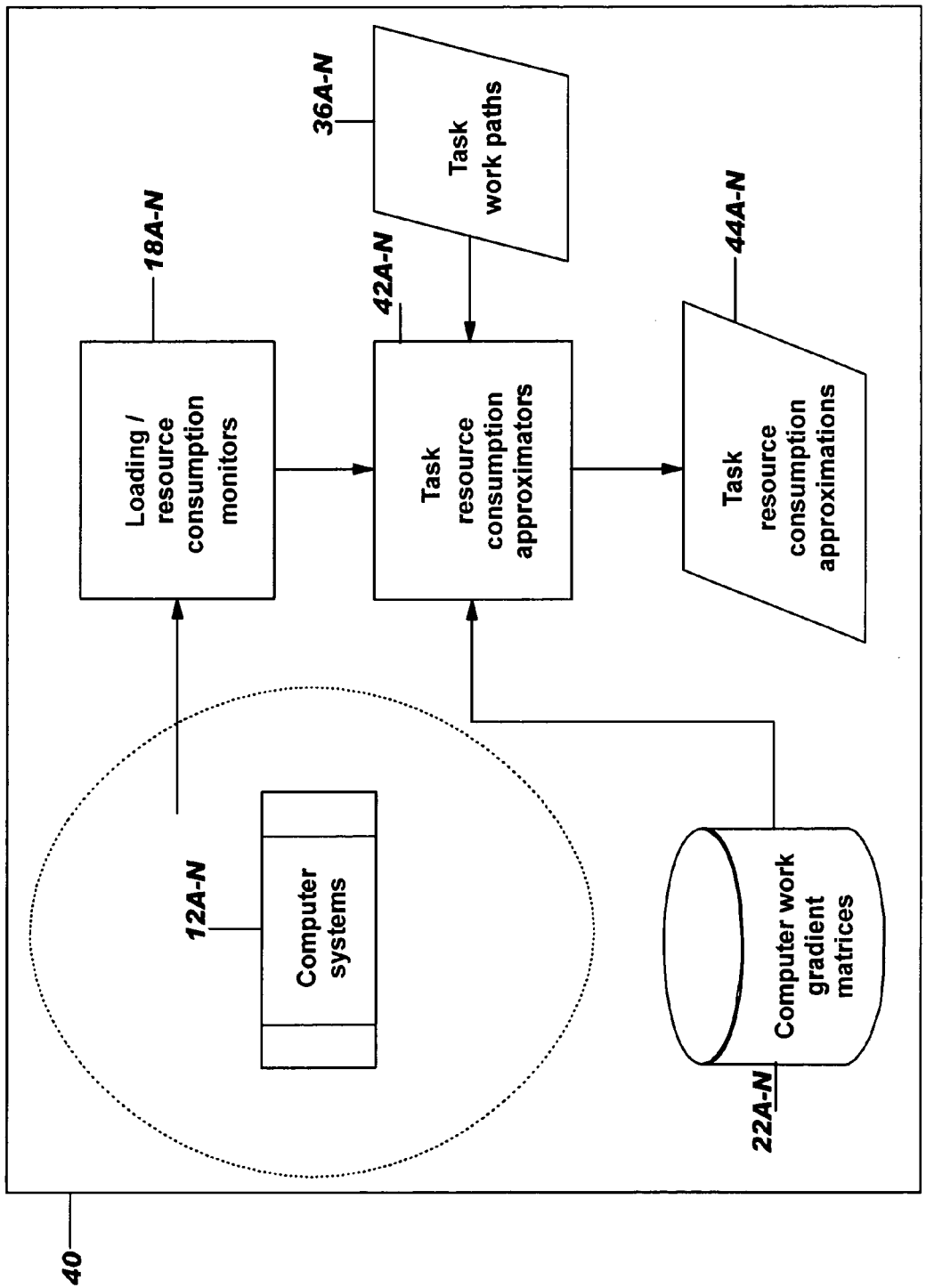
FIG. 8 depicts an illustrative system for approximating computer resource consumption on a first computer system using a computer work gradient matrix and task work path according to the present invention.

Once matrices 22A-N and task work path(s) 36A-N have been provided as indicated above, they can then be used to approximate resource consumption for any computer system 12A-N for a task at any background loading level. Referring now to FIG. 8, a system 40 for making this approximation is shown. Specifically, under system 40, loading/resource consumption monitors 18A-N measure the current background loading level on the respective computer systems 12A-N, and pass the measurements to task resource consumption approximators 42A-N. The task resource consumption approximators 42A-N then determine an approximation of the task resource consumption 44A-N by applying the given matrix 22A-N to appropriate elements along the task work path 36A-N for that computer system 12A-N in a relation to the computer background loading levels (measured when the original task work path 36A-N was built).

For example, assume that resource consumption is being approximated for computer system 12A. This process is further illustrated below:

(1) Loading/resource consumption monitor 18A provides the level of the current background loading for computer system 12A, which is where the task is to be run/applied.

(2) Task resource consumption approximator 42A loads the following information: current background loading of computer system 12A to be used for running the task, task work path 36A for the task to be run, matrix 22A for computer system 12A where task is to be run.

(3) Task resource consumption approximator 42A uses one of the methods of approximation based on current system background loading, matrix 22A, and task work path 36A to calculate approximate resource consumption for the task.

(4) As an illustrative example of such an approximation, task resource consumption approximator 42A may perform the following operations:

(A) Cut task work path 36A into elemental pieces such that each elemental piece is contained in 1 level of load (coordinates) for matrix 22A.

(B) Scale each elemental piece of task work path 36A with an associated coefficient from matrix 22A.

(C) Combine the results into new approximate task work path (not shown)—this new task work path will show resource/time consumption for the given system load.

(5) Store resulting approximate resource/time consumption 44A.

Thus, by first developing matrix 22A and task work path 36A, the resource consumption for any task under any background loading level can be approximated. As indicated above, however, it is also desirous to resource consumption computation to be consolidated onto a single, master computer system. As will be described below, the present invention allows this to occur.

E. Prediction of Resource Consumption

Figure 9:
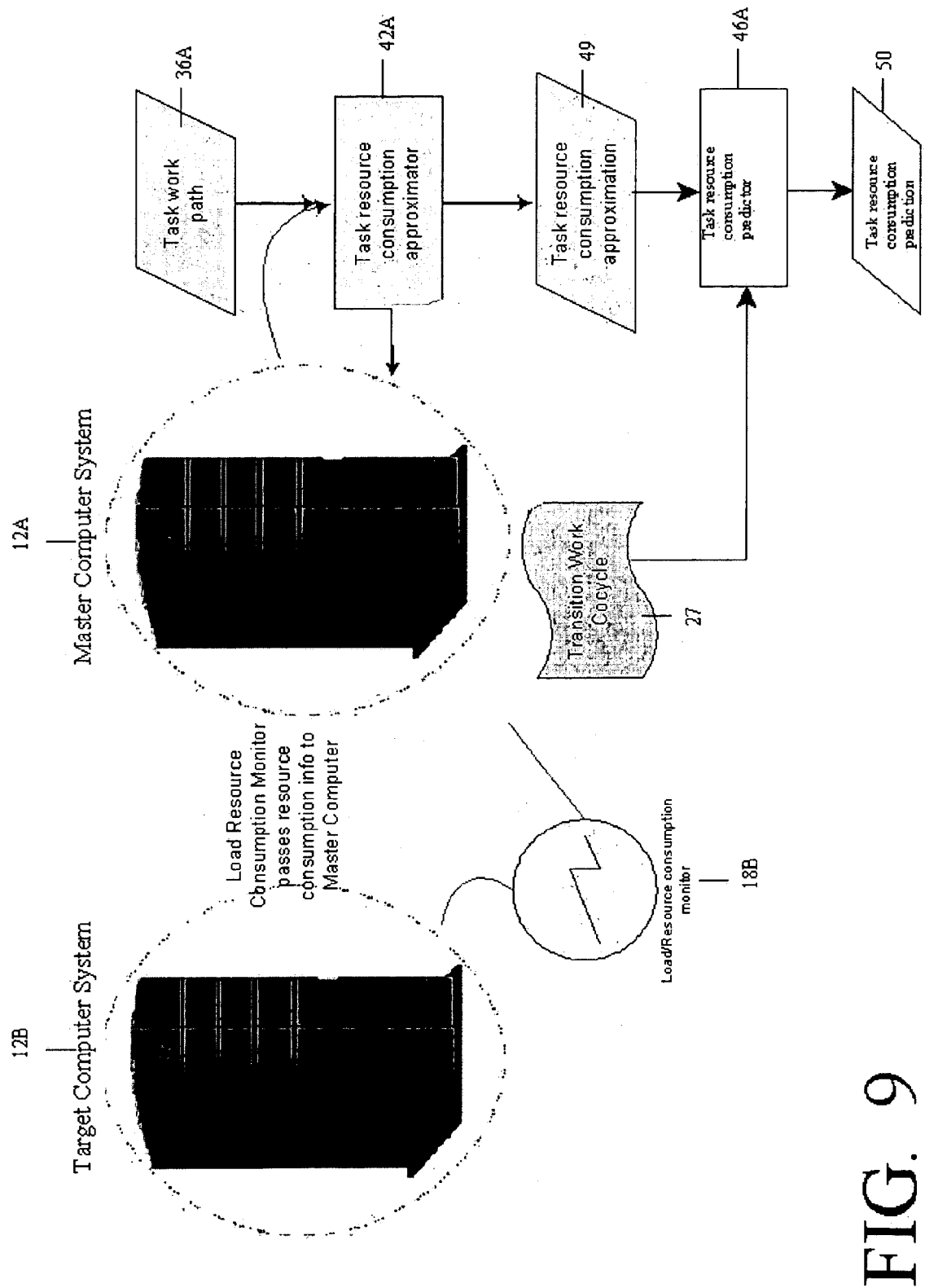
FIG. 9 depicts an illustrative system for predicting resource consumption of a second computer system on the first computer system according to the present invention

Under the present invention, a resource consumption for one (target) computer system can be predicted on another (master) computer system. Referring to FIG. 9, this process is shown in greater detail. Specifically, assume that a resource consumption is desired to be predicted for target computer system 12B. In this case, loading/resource consumption monitor 18B of target computer system 12B will measure a level of background loading currently being experienced on target computer system 12B. This background loading level/information will be communicated to master computer system 12A. Based on the computer work gradient matrix 22A for master computer system 12A, the set of task work paths 36A for master computer system 12A and the background loading level received for target computer system 12B, an initial resource consumption 49 will be computed on master computer system 12A by task resource consumption approximator 42A. Then, by applying the transition work cocycle 27 computed earlier for target computer system 12B to this initial value 49, a resource consumption 50 of target computer system 12B can be predicted by task resource consumption predictor 46A. Specifically, as mentioned above, the transition work cocycle 27 maps a workload tensor from target computer system 12B to master computer system as well as the task work paths 36A for master computer system 12A to target computer system 12B. As such, prediction of resource consumption for target computer system 12B from that calculated for master computer system 12B can be performed.

As can be seen, the present invention allows all calculations for predicting resource consumption to be conducted on one computer system (e.g., the master computer system 12A), instead of occurring on each individual target computer system. This is especially advantageous in environments where many target computer systems are deployed. All the individual target computer systems need to do is to communicate their respective levels of background loading to the appointed master computer system.

In a typical embodiment, the sequence of events described in sections A-E is carried out as follows:

(1) All core operations on the master computer system (e.g., building the computer work gradient matrix, constructing the set of task work paths, computer resource consumption, etc.) are performed once, namely, when the master computer system is "installed."

(2) All core operations on the target computer system are also performed once, when the target computer system is installed.

(3) The transition work cocycle is performed after the target computer system is installed and the core operations are completed.

(4) Predicting resource consumption for the target computer system should be done every time a new computing task needs to be deployed on the target computer system.

II. Computerized Implementation

Referring now to FIG. 10, a more specific computerized implementation of the present invention is shown. As depicted, FIG. 10 shows master computer system 12A communicating with target computer system 12B. Master computer system 12A is shown including a processing unit 104, a memory 106, a bus 108, and an input/output (I/O) interfaces 110. Further, master computer system 12A is shown in communication with external I/O devices/resources 112 and storage system 114. In general, processing unit 104 executes computer program code, such as prediction system 40, which is stored in memory 106 and/or storage system 114. While executing computer program code, processing unit 104 can read and/or write data, to/from memory 106, storage system 114, and/or I/O interfaces 110. Bus 108 provides a communication link between each of the components in master computer system 12A. External devices 112 can comprise any devices (e.g., keyboard, pointing device, display, etc.) that enables a user to interact with master computer system 12A and/or any devices (e.g., network card, modem, etc.) that enables master computer system 12A to communicate with one or more other computing devices, such as target computer system 12B.

Moreover, master computer system 12A is only representative of various possible computer infrastructures that can include numerous combinations of hardware. To this extent, in other embodiments, master computer system 12A can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 104 may comprise a single processing unit, or be distributed across one or more processing units in one or more locations, e.g., on a client and server or grid system. Similarly, memory 106 and/or storage system 114 can comprise any combination of various types of data storage and/or transmission media that reside at one or more physical locations. Further, I/O interfaces 110 can comprise any system for exchanging information with one or more external devices 112. Still further, it is understood that one or more additional components (e.g., system software, math co-processing unit, etc.) not shown in FIG. 10 can be included in master computer system 12A. However, if master computer system 12A comprises a handheld device or the like, it is understood that one or more external devices 112 (e.g., a display) and/or storage system(s) 30 could be contained within master computer system 12A, not externally as shown.

Storage system 114 can be any type of system (e.g., a database) capable of providing storage for information under the present invention. Such information can include, for example, computer work gradient matrices, task work paths, transition work cocycles, level of background loading, resource consumption values, etc. To this extent, storage system 114 could include one or more storage devices, such as a magnetic disk drive or an optical disk drive. In another embodiment, storage system 114 includes data distributed across, for example, a local area network (LAN), wide area network (WAN) or a storage area network (SAN) (not shown). Although not shown, additional components, such as cache memory, communication systems, system software, etc., may be incorporated into master computer system 12A. Moreover, although not shown for brevity purposes, target computer system 12B will likely contain computerized components similar to master computer system 12A.

Shown in memory 106 of master computer system 12A is prediction system 120 that includes the components of the present invention described above, namely, generator of background loading 14A, generator of elemental work increments 16A, loading/resource consumption monitor 18A, computer work gradient matrix builder 20A, transition work cocycle builder 25A, task generator 33A, task work path constructor 34A, task resource consumption approximator 42A, and task resource consumption predictor 46A. These components generally perform the functions described above. Specifically, generator of background loading 14A and generator of elemental work increments 16A will apply levels of background loading and elemental work increments to master computer system 12A. As this is occurring, resource consumption monitor 18A will monitor the resource consumption of computer system 12A. Based thereon, computer work gradient matrix builder 20A will build matrix 22A (e.g., for storage in storage unit 114).

In addition, task generator 33A can apply a task to computer system 12A (e.g., under a fixed level of background loading). As this is occurring, loading/resource consumption monitor 18A will monitor the resource consumption of computer system 12A and feed this information to task work path constructor 34A, which will use the same to construct task work path(s) 36A.

Although not shown, target computer system 12B will include some or all of the systems shown on master computer system 12B. At the very least, target computer system 12B will build a computer work gradient matrix (22B) for itself and provide the same to master computer system 12A. Upon receipt, transition work cocycle builder 25A will build a transition work cocycle (27) for target computer system 12B using their two computer work gradient matrices (22A-B). If a resource consumption is then desired to be predicted for target computer system 12B, loading resource consumption monitor 18B on target computer system 12B will determine the current level of background loading on target computer system 12B and provide the same to master computer system 12A. Once this is received, task resource consumption approximator 42A will compute an initial resource consumption based on the computer work gradient matrix (22A) and the task work paths (36A) for master computer system 12A, as well as the received background loading level information received for target computer system 12B. Then, task resource consumption predictor 46A will predict the resource consumption for target computer system 12B by applying the transition work cocycle (27) to the initial resource consumption value computed by task resource consumption approximator 42A. It should be understood that the collection of information such as computer work gradient matrices and current background loading levels of target computer systems can be accomplished by any component of prediction system 120, or by one or more separate "collectors" (shown in FIG. 4). Moreover, as indicated above, prediction system 120 is typically loaded on some or all of computer systems 12A-N (FIG. 1) so that any such computer system could function as a master computer system.

While shown and described herein as a method and system for predicting a resource consumption for a (target computer system), it is understood that the invention further provides various alternative embodiments. For example, in one embodiment, the invention provides a computer-readable medium that includes computer program code to enable a computer infrastructure to predict a resource consumption for a (target computer system). To this extent, the computer-readable medium includes program code that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 106 (FIG. 10) and/or storage system 114 (FIG. 10) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider could offer to predict a resource consumption for a (target computer system) as described above. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a method for predicting a resource consumption for a (target computer system). In this case, a computer infrastructure, can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as one or more of computer systems 12A-N (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation;

and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for predicting a resource consumption for one computer system on another computer system, comprising:
   obtaining a computer work gradient matrix for each of a first computer system and a second computer system;
   constructing a set of task work paths for the second computer system by executing a computing task and measuring consumption levels of the computing task in work increments;
   obtaining, on the second computer system, a transition work cocycle for the first computer system, wherein the transition work cocycle is based on the computer work gradient matrices and maps a work load tensor and the set of task work paths of the first computer system to a work load tensor and the set of task work paths of the second computer system to translate work loads in the work gradient matrix of the first computer to equivalent work loads in the work gradient matrix of the second computer;
   computing an initial resource consumption on the second computer system based on the computer work gradient matrix of the second computer system, the set of task work paths, and a current background loading level of the first computer system; and
   predicting, on the second computer system, a resource consumption of the first computer system based on the initial resource consumption computed on the second computer system and the transition work cocycle for the first computer system.

2. The method of claim 1, wherein the computer work gradient matrices set forth consumption levels of a set of resources of the first computer system and the second computer system in response to a set of background loading levels and a set of elemental work increments applied to the first computer system and the second computer system by, for each of the first computer system and the second computer system, including information gathered by executing a set of calibrated tasks to achieve a predetermined background loading level and, with the computer system operating at the background loading level, performing a set of predefined operations having known values measured in the work increments on the computer system.

3. The method of claim 2, further comprising:
   applying the set of background loading levels to the first computer system and the second computer system;
   applying the set of elemental work increments to the first computer system and the second computer system;
   monitoring the consumption levels of the set of resources for the first computer system and the second computer system in response to the applied set of background loading levels and set of elemental work increments; and
   building the computer work gradient matrix for each of the first computer system and the second computer system based on the monitoring.

4. The method of claim 2, wherein each of the set of task work paths characterize consumption levels for one of the set of resources in response to a computing task applied to the second computer system at a distinct background loading level.

5. The method of claim 4, wherein the constructing step comprises:
   applying the distinct background loading level to the second computer system;
   applying the computing task to the second computer system;
   monitoring the consumption levels for the set of resources in response to the distinct background loading level and the computing task; and
   constructing a set of task work paths for the set of resources based on the monitoring.

6. The method of claim 2, wherein the set of resources comprise memory utilization and CPU utilization.

7. The method of claim 1, wherein the computing step comprises:
   obtaining the current background loading level of the first computer system;
   accessing the computer work gradient matrix and the set of task work paths for the second computer system; and
   computing the initial resource consumption using the computer work gradient matrix and the set of task work paths for the second computer system, as well as the current background loading level of the first computer system.

8. A computer system for predicting a resource consumption for one computer system on another computer system, comprising:
   a system for obtaining a computer work gradient matrix for each of a first computer system and a second computer system;
   a system for constructing a set of task work paths for the second computer system executing a computing task and measuring consumption levels of the computing task in work increments;
   a system for obtaining, on the second computer system, a transition work cocycle for the first computer system, wherein the transition work cocycle is based on the computer work gradient matrices and maps a work load tensor and the set of task work paths of the first computer system to a work load tensor and the set of task work paths of the second computer to translate work loads in the work gradient matrix of the first computer to equivalent work loads in the work gradient matrix of the second computer;
   a system for computing an initial resource consumption on the second computer system based on the computer work gradient matrix of the second computer system, the set of task work paths, and a current background loading level of the first computer system; and
   a system for predicting, on the second computer system, a resource consumption of the first computer system based on the initial resource consumption computed on the second computer system and the transition work cocycle for the first computer system to the second computer system.

9. The computer system of claim 8, wherein the computer work gradient matrices set forth consumption levels of a set of resources of the first computer system and the second computer system in response to a set of background loading levels and a set of elemental work increments applied to the first computer system and the second computer system by, for each of the first computer system and the second computer system, including information gathered by executing a set of calibrated tasks to achieve a predetermined background loading level and, with the computer system operating at the background loading level, performing a set of predefined operations having known values measured in the work increments on the computer system.

10. The computer system of claim 9, further comprising:
a system for applying the set of background loading levels to the first computer system and the second computer system;
a system for applying the set of elemental work increments to the first computer system and the second computer system;
a system for monitoring the consumption levels of the set of resources for the first computer system and the second computer system in response to the applied set of background loading levels and set of elemental work increments; and
a system for building the computer work gradient matrix for each of the first computer system and the second computer system based on the monitoring.

11. The computer system of claim 9, wherein each of the set of task work paths characterize consumption levels for one of the set of resources in response to a computing task applied to the second computer system at a distinct background loading level, and wherein the transition work cocycle further maps the set of task work paths for the second computer system to the first computer system.

12. The computer system of claim 11, further comprising:
a system for applying the distinct background loading level to the second computer system;
a system for applying the computing task to the second computer system;
a system for monitoring the consumption levels for the set of resources in response to the distinct background loading level and the computing task; and
a system for constructing the set of task work paths for the set of resources based on the monitoring.

13. The computer system of claim 9, wherein the set of resources comprise memory utilization and CPU utilization.

14. The computer system of claim 8, wherein the system for computing the initial resource consumption comprises:
a system for obtaining the current background loading level of the first computer system;
a system for accessing the computer work gradient matrix and the set of task work paths for the second computer system; and
a system for computing the initial resource consumption by using the computer work gradient matrix and the set of task work paths for the second computer system, as well as the current background loading level of the first computer system.

15. A program product stored on a computer readable storage medium for predicting a resource consumption for one computer system on another computer system, the computer readable medium comprising program code for performing the following steps:
obtaining a computer work gradient matrix for each of a first computer system and a second computer system;
constructing a set of task work paths for the second computer system by executing a computing task and measuring consumption levels of the computing task in work increments;
obtaining, on the second computer system, a transition work cocycle for the first computer system, wherein the transition work cocycle is based on the computer work gradient matrices and maps a work load tensor and the set of task work paths of the first computer system to a work load tensor and the set of task work paths of the second computer system to translate work loads in the work gradient matrix of the first computer to equivalent work loads in the work gradient matrix of the second computer;
computing an initial resource consumption on the second computer system based on the computer work gradient matrix of the second computer system, the set of task work paths, and a current background loading level of the first computer system; and
predicting, on the second computer system, a resource consumption of the first computer system based on the initial resource consumption computed on the second computer system and the transition work cocycle for the first computer system.

16. The program product of claim 15, wherein the computer work gradient matrices set forth consumption levels of a set of resources of the first computer system and the second computer system in response to a set of background loading levels and a set of elemental work increments applied to the first computer system and the second computer system by, for each of the first computer system and the second computer system, including information gathered by executing a set of calibrated tasks to achieve a predetermined background loading level and, with the computer system operating at the background loading level, performing a set of predefined operations having known values measured in the work increments on the computer system.

17. The program product of claim 16, further comprising:
applying the set of background loading levels to the first computer system and the second computer system;
applying the set of elemental work increments to the first computer system and the second computer system;
monitoring the consumption levels of the set of resources for the first computer system and the second computer system in response to the applied set of background loading levels and set of elemental work increments; and
building the computer work gradient matrix for each of the first computer system and the second computer system based on the monitoring.

18. The program product of claim 16, wherein each of the set of task work paths characterize consumption levels for one of the set of resources in response to a computing task applied to the second computer system at a distinct background loading level, and wherein the transition work cocycle further maps the set of task work paths for the second computer system to the first computer system.

19. The program product of claim 18, wherein the constructing step comprises:
applying the distinct background loading level to the second computer system;
applying the computing task to the second computer system;
monitoring the consumption levels for the set of resources in response to the distinct background loading level and the computing task; and
constructing a set of task work paths for the set of resources based on the monitoring.

20. The program product of claim 16, wherein the set of resources comprise memory utilization and CPU utilization.

21. The program product of claim 15, wherein the computing step comprises:
obtaining the current background loading level of the first computer system;
accessing the computer work gradient matrix and the set of task work paths for the second computer system; and
computing the initial resource consumption using the computer work gradient matrix and the set of task work paths for the second computer system, as well as the current background loading level of the first computer system.

22. A method for deploying an application for predicting a resource consumption for one computer system on another computer system, comprising: providing a computer infrastructure being operable to:
- obtain a computer work gradient matrix for each of a first computer system and a second computer system;
- construct a set of task work paths for the second computer system by executing a computing task and measuring consumption levels of the computing task in work increments;
- obtain, on the second computer system, a transition work cocycle for the first computer system, wherein the transition work cocycle is based on the computer work gradient matrices and maps a work load tensor and the set of task work paths of the first computer system to a work load tensor and the set of task work paths of the second computer system to translate work loads in the work gradient matrix of the first computer to equivalent work loads in the work gradient matrix of the second computer;
- compute an initial resource consumption on the second computer system based on the computer work gradient matrix of the second computer system, the set of task work paths, and a current background loading level of the first computer system; and
- predict, on the second computer system, a resource consumption of the first computer system based on the initial resource consumption computed on the second computer system and the transition work cocycle for the first computer system.

* * * * *